(12) United States Patent
Wang et al.

(10) Patent No.: US 7,276,002 B2
(45) Date of Patent: Oct. 2, 2007

(54) SURFACE TEXTURE CONFIGURATION FOR CVT PULLEY

(75) Inventors: Yucong Wang, West Bloomfield, MI (US); Beizhi Zhou, Troy, MI (US); Serge V. Guillot, Sylvania, OH (US); Robert J. Porter, Clinton, MI (US); Sohail A. Khan, Farmington, MI (US); Chester N. Grant, Ortonville, MI (US)

(73) Assignee: General Motors Corporation, Detroit, MI (US)

( * ) Notice: Subject to any disclaimer, the term of this patent is extended or adjusted under 35 U.S.C. 154(b) by 623 days.

(21) Appl. No.: 10/691,891

(22) Filed: Oct. 23, 2003

(65) Prior Publication Data

US 2005/0090340 A1    Apr. 28, 2005

(51) Int. Cl.
  *F16H 9/08* (2006.01)
  *F16H 9/12* (2006.01)
  *F16H 55/52* (2006.01)
(52) U.S. Cl. .......................... 474/8; 474/174; 474/177
(58) Field of Classification Search ............... 474/8, 474/12, 46, 174, 175, 188; 29/894, 892.2; 205/333, 668, 673; 315/209 R, 224; 254/360
See application file for complete search history.

(56) References Cited

U.S. PATENT DOCUMENTS

| | | | | |
|---|---|---|---|---|
| 2,892,354 A | * | 6/1959 | Amonsen | 474/46 |
| 4,781,660 A | * | 11/1988 | Amataka et al. | 474/174 |
| 4,947,533 A | * | 8/1990 | Taniguchi et al. | 29/894 |
| 5,895,335 A | | 4/1999 | Haka | 475/210 |
| 6,068,564 A | * | 5/2000 | Takahara | 474/12 |
| 6,078,143 A | * | 6/2000 | Nerone | 315/209 R |
| 6,106,689 A | * | 8/2000 | Matsuyama | 205/333 |
| 6,254,503 B1 | * | 7/2001 | Chiba et al. | 474/8 |
| 6,287,227 B1 | | 9/2001 | Vahabzadeh et al. | 474/28 |
| 6,537,166 B1 | * | 3/2003 | Adriaenssens et al. | 474/8 |

FOREIGN PATENT DOCUMENTS

| | | | | | |
|---|---|---|---|---|---|
| JP | (59-205064 A | * | 11/1984 | | 254/360 |
| JP | (62-30900 A | * | 2/1987 | | 205/668 |
| JP | 02-30437 A | * | 1/1990 | | 28/892.2 |
| JP | (2001-343056 A | * | 12/2001 | | |
| JP | (2002-21956 A | * | 1/2002 | | |
| JP | (2002-70992 A | * | 3/2002 | | |
| JP | (2002-178151 A | * | 6/2002 | | |
| JP | (2002-213580) | * | 7/2002 | | |

* cited by examiner

*Primary Examiner*—Marcus Charles

(57) ABSTRACT

A pulley engageable with a belt for use in a continuously variable transmission includes first and second pulley halves rotatable about an axis and relatively moveable in a direction of the axis. The pulley halves include truncated conical portions symmetrically opposed to each other and outer surfaces which are axially opposed to each other and sloped relative to the axis. The outer surfaces have a circumferential roughness average (Ra,y) measured in a direction (y) circumferential to the axis between approximately 0.15 and 1.0 micrometer. The outer surfaces have a radial roughness average (Ra,x) measured in a direction (x) radial to the axis, and a ratio Ra,x/Ra,y between approximately 0.5 and 2.5.

11 Claims, 1 Drawing Sheet

SURFACE TEXTURE CONFIGURATION FOR CVT PULLEY

TECHNICAL FIELD

The present invention relates to a continuously variable transmission (CVT) pulley having a surface texture designed for high torque capacity by providing a predetermined roughness average in a circumferential direction and a radial/circumferential roughness ratio within a predetermined range.

BACKGROUND OF THE INVENTION

Continuously variable transmissions (CVT) of the variable pulley or sheave type, employ pulley assemblies having at least one member that is moveable to control the diameter at which a flexible transmitter, such as a belt or chain, operates. The transmission has an input pulley and an output pulley, both of which have an adjustable member. The transmission ratio between the input and the output pulleys varies between an underdrive ratio and an overdrive ratio.

The CVT ratio is continuously variable between the extremes of the underdrive and overdrive ratios. During the underdrive ratios, the flexible transmitter is positioned at a small diameter on the input pulley and a large diameter on the output pulley. Thus, the input pulley has more than one revolution for each revolution of the output pulley. As the diameter of the input pulley increases, the diameter of the output pulley decreases until a 1:1 ratio exists across the pulleys. During the overdrive ratios, the diameter of the input pulley is maintained larger than the diameter of the output pulley. Thus, each revolution of the input pulley results in more than one revolution of the output pulley.

To accommodate the ratio variance, at least one member of each of pulley is disposed to slide axially relative to the other member of the pulley. This movement is typically controlled hydraulically.

CVTs have become increasingly popular in recent years because they may provide improved fuel economy, the ability to operate the engine at lower rpms over a wider range of the fuel economy schedule, smoother shifting (ratioing), more efficient vehicle front end packaging, as well as manual transmission interchangeability and all-wheel drive compatibility. In vehicles with higher horse power engines, CVTs are required to have higher torque capacity and excellent durability or wear resistance of components. The high torque carrying capacity is achieved by maintaining high frictional engagement between the belts and pulleys. Durability is achieved by limiting wear resistance of the pulley surfaces.

It has been found that pulleys with higher roughness show higher friction carrying capability with minimal slippage. Accordingly, the surface of the pulley is usually engineered to a high roughness average (Ra), measured in a radial direction with respect to the axis of rotation of the pulley, which is also referred to as a "centerline average roughness." By way of example, U.S. Pat. No. 6,254,503 teaches a pulley having a centerline roughness average (Ra) of 0.1 to 0.5 microns, and a Vickers hardness of not less than 850 at a load of 200 g. However, the control of average roughness (Ra) in a radial direction of the pulley has proved to be ineffective.

SUMMARY OF THE INVENTION

With the present invention, it has been discovered that the CVT pulley torque carrying performance is determined by the relationship between the measured surface texture parameters in both circumferential and radial directions of the pulley. Previously, average roughness has been measured with a traditional stylus surface profilometer, which only measured roughness along the radial direction of the pulley because it was a straight line, and was therefore the only dimension which the traditional stylus could measure. However, using tribology, the surface roughness in the circumferential direction of the pulley may be measured and engineered to determine and control the friction between the belt and the pulley, which determines whether slippage occurs or not.

More specifically, the invention provides a pulley engageable with a belt for use in a continuously variable transmission (CVT), including first and second pulley halves rotatable about an axis and relatively moveable in a direction of the axis. The pulley halves include truncated conical portions symmetrically opposed to each other and outer surfaces which are axially opposed to each other and sloped relative to the axis. The outer surfaces have a circumferential roughness average (Ra,y) measured in a direction circumferential to the axis between approximately 0.15 and 1 micrometer. Also, the outer surfaces have a radial roughness average (Ra,x) measured in a direction radial to the axis, and a ratio Ra,x/Ra,y between approximately 0.5 and 2.5.

The surface texture may be achieved by shot peening, grinding, stone polishing or tape polishing.

The above features and advantages, and other features and advantages of the present invention are readily apparent from the following detailed description of the preferred embodiment for carrying out the invention when taken in connection with the accompanying drawings.

DESCRIPTION OF THE PREFERRED EMBODIMENTS

Figure 1:
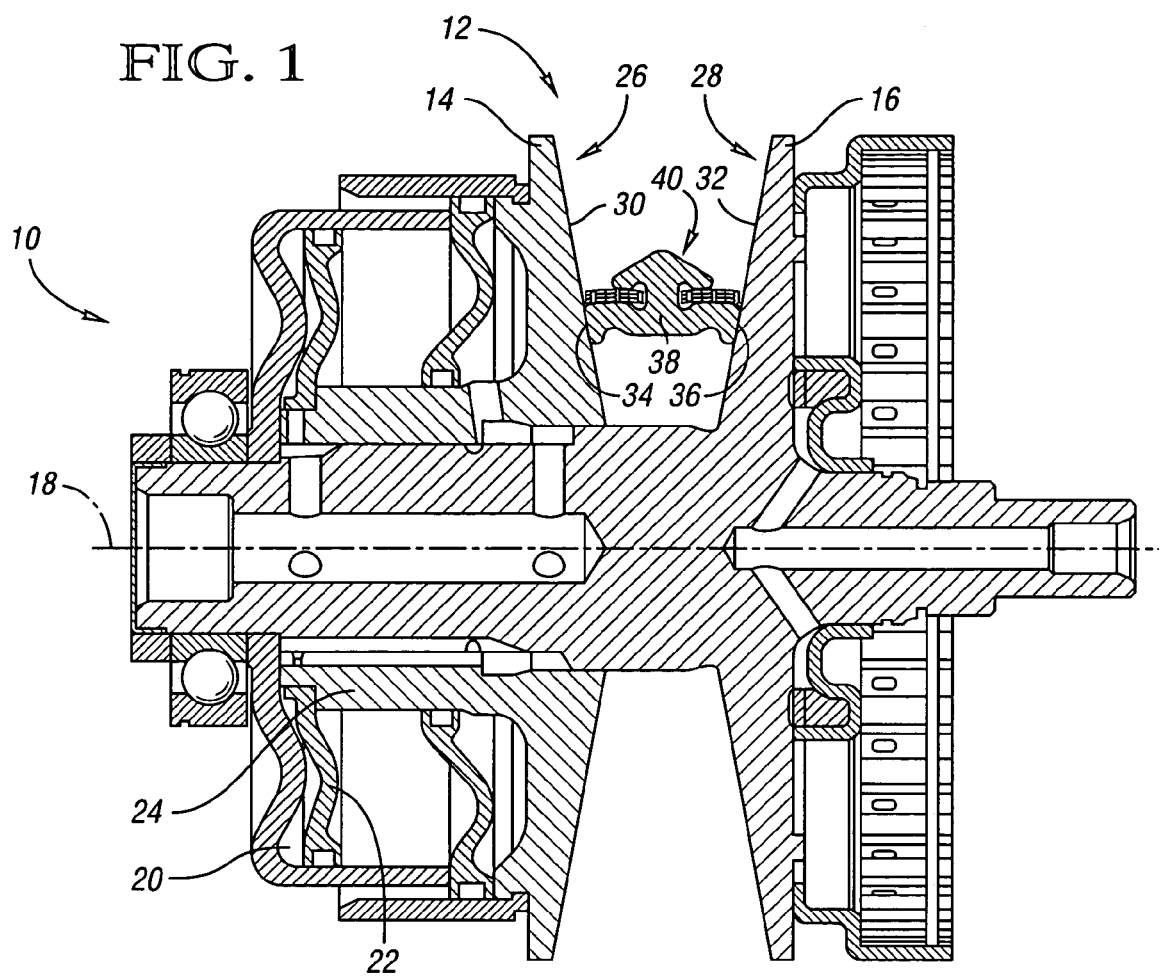
FIG. 1 shows a representative cross-sectional view of a continuously variable transmission (CVT) having pulley surfaces configured in accordance with the present invention.

Referring to FIG. 1, a representative cross-sectional view of a portion of a continuously variable transmission (CVT) 10 is shown. The CVT 10 includes a pulley 12 having first and second pulley halves 14, 16 which are rotatable about an axis 18. The pulley half 16 is fixed with respect to the axis, and the pulley half 14 is moveable along the axis 18 when pressurized fluid is provided in the apply chamber 20 for moving the piston 22 and hub 24 of the pulley 14 to the right as viewed in FIG. 1.

Supporting information related to the design and build of continuously variable transmissions may be found in U.S. Pat. Nos. 6,287,227; 6,254,503; and 5,895,335, each of which is hereby incorporated by reference in its entirety.

Referring again to FIG. 1, the pulley halves 14, 16 have truncated conical portions 26, 28, respectively, with outer surfaces 30, 32 which are axially opposed to each other and sloped relative to the axis 18. The outer surfaces 30, 32 contact the sides 34, 36 of the element 38 of the belt 40. The engagement of the sides 34, 36 of the element 38 with the outer surfaces 30, 32 of the first and second pulley halves 14, 16 is an important frictional engagement which must maintain high torque carrying capacity as a result of high friction, as well as significant durability or wear resistance.

Figure 2:
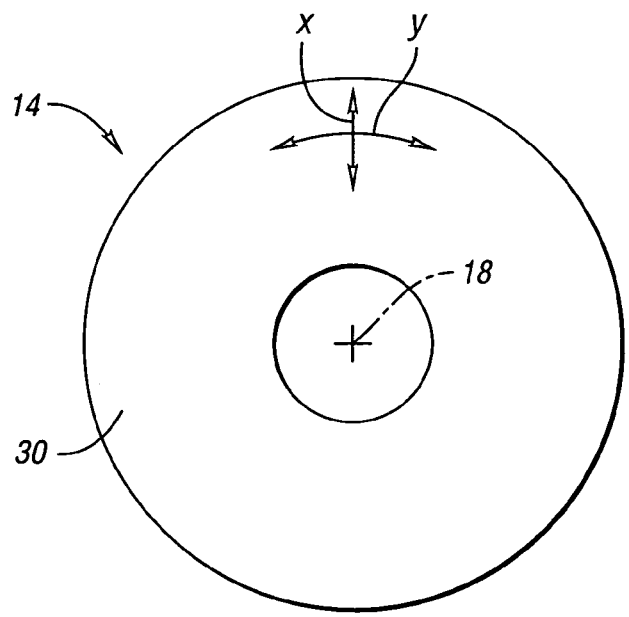
FIG. 2 shows a schematic front view of a pulley in accordance with the invention.

The roughness of pulley outer surfaces has traditionally been measured by a stylus surface profilometer, which measures only along a straight line. Therefore, the traditional measurement has always been in the radial direction x with respect to the axis 18 as illustrated in FIG. 2. As a result of the generation of a significant database of 3-D surface texture parameters on a wide variety of pulleys, including Ra, Rv, Rp, as well as the roughness average in the radial direction (Ra,x) and the roughness average in the circumferential direction (Ra,y), a clear relationship between pulley performance and average roughness measured in the x and y directions became apparent. Because the belt 40 contacts the pulley along the circumferential direction y of the outer face 30 of the pulley 14, the present invention recognizes the importance of the roughness along the dimension y. The three dimensional measurements of the various pulleys in the database referenced above was done with a Veeco machine, which uses an optical scope rather than a stylus. An example of such a machine is a Wyko NT 8000 Optical Profiler, which is available from Veeco Instruments, Inc. of Tucson, Ariz. This machine includes a signal generator, beam splitter, illuminator, translator and mirau interferometer. After examining all of the data from the database resulting from these measurements, it has been concluded that the following surface texture design criteria should be met in order to pass shock load testing for a pulley surface, the result of which is a pulley surface maintaining high torque carrying capacity and high durability. Specifically, the roughness average measured along the y direction (Ra,y) of FIG. 2 should be between approximately 0.15 and 1.0 micrometer. The roughness average along the dimension x (Ra,x) should also be monitored, and the ratio or Ra,x/Ra,y should be between approximately 0.5 and 2.5 to achieve sufficient torque carrying capacity and durability.

The pulley surface design criteria are independent of the pulley machining processes, such as shot peening, stone polishing, grinding or tape polishing. The likely reason that shot peening pulleys fall within the desired range is that a significant number of dimples are generated by shot peening, which increases the Ra,y dimension. The same reason applies to stone polished pulleys that have a cross-hatch pattern, and resulting higher Ra,y.

The ratio of Ra,x/Ra,y is an isotropic (non-directional) factor. Due to the nature of the machining processes, this ratio is usually larger than 1 (a 45 degree cross-hatch can make this ratio equal to 1). If this ratio is around 4, it means that the average roughness in the x direction is four times higher than in the y direction. This is not good from a friction standpoint. It should be noted that tape polishing can also be used to make the required pulley surface texture in accordance with the above defined parameters. A Supfina or Thielenhaus tape polishing apparatus may be used to achieve these results.

The pulley halves are made of medium carbon steel having a carburized surface. The pulley halves are made by first machining, then carburizing, and then final machining (i.e., grinding, stone polishing, tape polishing or shot peening) to achieve the desired surface characteristics. By way of example, in stone polishing, the stone may be moved radially along the pulley surface during the machining operation to achieve more of an angled pattern to increase the Ra,y dimension.

When a small CVT is used for a relatively large engine, the pulley surface texture design becomes a significant issue due to the higher friction requirement. Accordingly, this invention provides the pulley surface texture design criteria which enables the design and build of a CVT having high torque capacity. The higher CVT torque capacity may reduce CVT cost, improve product durability and provide the opportunity for improved packaging.

In summary, high torque capacity through high friction between elements and pulleys, as well as good durability (or high wear resistance) are the two basic requirements for high performance CVTs. Failure to meet these requirements may result in severe noise, unstable operation, and failure of the CVTs. CVT manufacturers have been trying various pulley surface machining techniques for years, however none of the published work has understood the fundamental relationship between pulley friction and CVT high torque performance. In other words, none of the published work addresses the measurement and control of the roughness average along the circumferential y direction of the pulley with respect to the axis of rotation of the pulley. The current invention has overcome these deficiencies.

While the best mode for carrying out the invention has been described in detail, those familiar with the art to which this invention relates will recognize various alternative designs and embodiments for practicing the invention within the scope of the appended claims.

The invention claimed is:

1. A pulley engageable with a belt for use in a continuously variable transmission (CVT), comprising:
first and second pulley halves rotatable about an axis and relatively moveable in a direction of the axis, said pulley halves including truncated conical portions symmetrically opposed to each other and outer surfaces being axially opposed to each other and sloped relative to the axis, said outer surfaces having a circumferential roughness average (Ra,y) measured in a direction (y) circumferential to the axis between approximately 0.15 and 1 micrometer.

2. The pulley of claim 1, wherein said outer surfaces have a radial roughness average (Ra,x) measured in a direction (x) radial to the axis, and a ratio Ra,x/Ra,y between approximately 0.5 and 2.5.

3. The pulley of claim 2, wherein said outer surfaces are machined by shot peening, grinding, stone polishing or tape polishing.

4. The pulley of claim 2, wherein said circumferential roughness average (Ra,y) is between 0.17 and 0.3 micrometers, and said ratio Ra,x/Ra,y is between 1.7 and 2.3.

5. A pulley engageable with a belt for use in a continuously variable transmission (CVT), comprising:
first and second pulley halves rotatable about an axis and relatively moveable in a direction of the axis, said pulley halves including truncated conical portions symmetrically opposed to each other and outer surfaces being axially opposed to each other and sloped relative to the axis, said outer surfaces having a radial roughness average (Ra,x) measured in a direction (x) radial to the axis, a circumferential roughness average (Ra,y) measured in a direction (y) circumferential to the axis, and a ratio Ra,x/Ra,y between approximately 0.5 and 2.5.

6. The pulley of claim 5, wherein said circumferential roughness average (Ra,y) is between approximately 0.15 and 1 micrometer.

7. The pulley of claim 6, wherein said circumferential roughness average (Ra,y) is between 0.17 and 0.3 micrometers, and said ratio Ra,x/Ra,y is between 1.7 and 2.3.

8. The pulley of claim 6, wherein said outer surfaces are machined by shot peening, grinding, stone polishing or tape polishing.

9. A pulley engageable with a belt for use in a continuously variable transmission, comprising:
- first and second pulley halves rotatable about an axis and relatively moveable in a direction of the axis, said pulley halves including truncated conical portions symmetrically opposed to each other and outer surfaces being axially opposed to each other and sloped relative to the axis, said outer surfaces having a radial roughness average (Ra,x) measured in a direction (x) radial to the axis, a circumferential roughness average (Ra,y) measured in a direction (y) circumferential to the axis between approximately 0.15 and 1.0 micrometer, and a ratio Ra,x/Ra,y between approximately 0.5 and 2.5.

10. The pulley of claim 9, wherein said circumferential roughness average (Ra,y) is between 0.17 and 0.3 micrometers, and said ratio Ra,x/Ra,y is between 1.7 and 2.3.

11. The pulley of claim 9, wherein said outer surfaces are machined by shot peening, grinding, stone polishing or tape polishing.

\* \* \* \* \*